United States Patent [19]
Alliegro

[11] 4,153,666
[45] May 8, 1979

[54] HOT-PRESSING OF SHAPES OF NON-UNIFORM CROSS-SECTIONAL THICKNESS

[75] Inventor: Richard A. Alliegro, Holden, Mass.

[73] Assignee: Norton Company, Worcester, Mass.

[21] Appl. No.: 441,737

[22] Filed: Feb. 12, 1974

Related U.S. Application Data

[63] Continuation of Ser. No. 213,124, Dec. 28, 1971, abandoned.

[51] Int. Cl.² .............................................. B29C 3/00
[52] U.S. Cl. ..................................... 264/325; 264/332
[58] Field of Search ................................. 264/332, 325

[56] References Cited

U.S. PATENT DOCUMENTS

| | | | |
|---|---|---|---|
| 2,990,602 | 7/1961 | Brandmayr et al. | 264/332 |
| 3,279,917 | 10/1966 | Ballard et al. | 264/332 |
| 3,467,745 | 9/1969 | Lambertson et al. | 264/317 |

*Primary Examiner*—Robert F. White
*Assistant Examiner*—James R. Hall
*Attorney, Agent, or Firm*—Rufus M. Franklin

[57] ABSTRACT

Uniaxial hot-pressing of ceramic powders to produce monolithic shapes of non-uniform thickness is accomplished by employing a form, preformed to a shape which when properly oriented and uniaxially compressed to final density will deform orderly to assume the final desired shape, and hot-pressing it in a mold against preformed parts having surfaces exactly mating with the surfaces of the preform. Such mold parts have the same compaction ratio as the preform, and a coefficient of thermal expansion substantially equal to that of the preform, and are formed of a powdered composition which is non-reactive with the preform material under hot-pressing conditions. Suitable compositions for the mold part preforms are temporarily bonded mixtures of carbon or graphite powder and a powder material of the preform. The shapes may be slip cast or cold pressed and temporary binders of organic or inorganic material may be employed to give green strength to the parts.

2 Claims, 2 Drawing Figures

HOT-PRESSING OF SHAPES OF NON-UNIFORM CROSS-SECTIONAL THICKNESS

This is a continuation of application Ser. No. 213,124, filed Dec. 28, 1971, now abandoned.

BACKGROUND OF THE INVENTION

The invention relates to the hot-pressing of powders to precise shape. Hot-pressing of ceramic materials has been accomplished for tens of years by axially loading a die, usually graphite, containing a suitably active powder which only densifies under the influence of heat and pressure. Because of the nature of the process, and the characteristics of the powder, relatively simple cross sections are possible. If one attempts more complex geometry, shapes can be formed; these, however, suffer from non-uniform density and anisotropic physical and mechanical properties.

Gas turbine development has progressed over the years to the point where metals and alloys have reached their limit, even when expensive cooling air is used to keep properties from degrading. It has become essential to look at ceramics for an answer. However, because of the above limitations, historically, hot-pressed-to-shape articles have tended to be dismissed as viable components for gas turbine application.

The present invention provides a process which allows for the hot-pressing of complex geometric shapes, in particular shapes required for automotive, aircraft, and stationary power, gas turbines. When a material is compacted, a normal molding ratio exists whereby, say a 2 inch thick preform can be compacted to 1 inch and its bulk density increased from 50% to 100% of theoretical. If materials acted hydrostatically and would flow into cavities, such as with the case of pressure casting of molten metals, any shape within reason could be made. Ceramic materials act like damp sand, however, bridging from one particle to the next, densifying mainly by solid state diffusion and migration of holes.

THE DRAWINGS

FIG. 1 is a cross-sectional view, taken parallel to the pressing axis, of the preform 10, matrix parts 11, mold 12, and plugs or piston 13 prior to the application of pressure.

FIG. 2 is the same sectional view as in FIG. 1, but taken after the hot-pressing operation has been completed, showing parts 10 and 11 in fully densified condition, with the mold plunger 13 in its fully depressed position.

SUMMARY OF THE INVENTION

This invention provides a pre-shaped preform illustrated in FIG. 1 wherein the thickness of the cross section is doubled around a common null plane (for a compaction ratio of 0.5). This provides the proper amount of material for densification for each element of thickness normal to the plane which integrated through the cross section provides the correct pressing relationship. Critical to this concept is that the preformed matrix, surrounding the shape to be densified, have the exact compaction rate and ratio as the shape. This allows a uniform densifying of the total mass resulting in the configuration shown in FIG. 2, after pressing. In order to have the matrix material compress at the same rate, and to introduce no stresses during pressing or cooling, it is compounded, for example, from powdered carbon or graphite, and the powder, material 10. This has the unique ability to start contracting at the same temperature as material 10, yet is soft enough after compaction because of the carbon or graphite content, to be easily sandblasted or otherwise removed from the much harder, densified material 10 portion. Another critical factor is the bulk density of matrix 11; it is formulated around a 50:50 composition, and pre-compacted to a density which subsequently during hot-pressing compresses in the same ratio as material 10. Slight corrections can be made to achieve this by varying the compositional ratio and/or the particle size and shape of the powders, and pressing the preform to a higher or lower density. Once this relationship is established, it can be used for all such similar pressings.

Other matrices can be used so long as they exhibit similar compaction rates and ratios. As an example, boron nitride can be substituted for carbon or graphite, and any powdered material which hot-presses in the same temperature range as the material being formed can be used. Critical to this consideration, however, is that when intricate shapes are made, the total hot-pressed mass must contract uniformly on cooling or undue stresses may be imposed on the finished article. When the coefficients a thermal expansion of the matrix and the part preform differ, the matrix material should have the higher coefficient. This characteristic is critical since rigid graphite parts used conventionally to make somewhat intricate shapes will impose stresses which can cause failure of the article in the mold during cooling.

DESCRIPTION OF THE PREFERRED EMBODIMENTS

Figure 1:
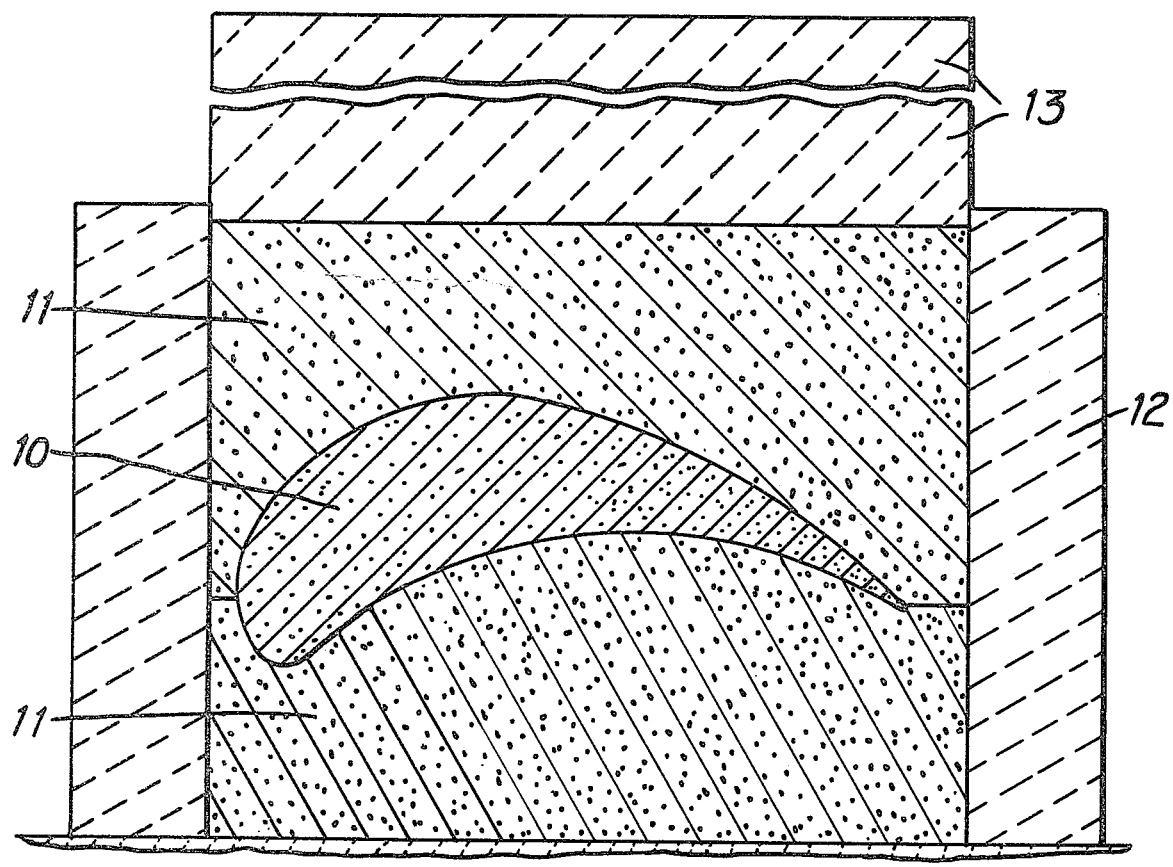
Figure 2:
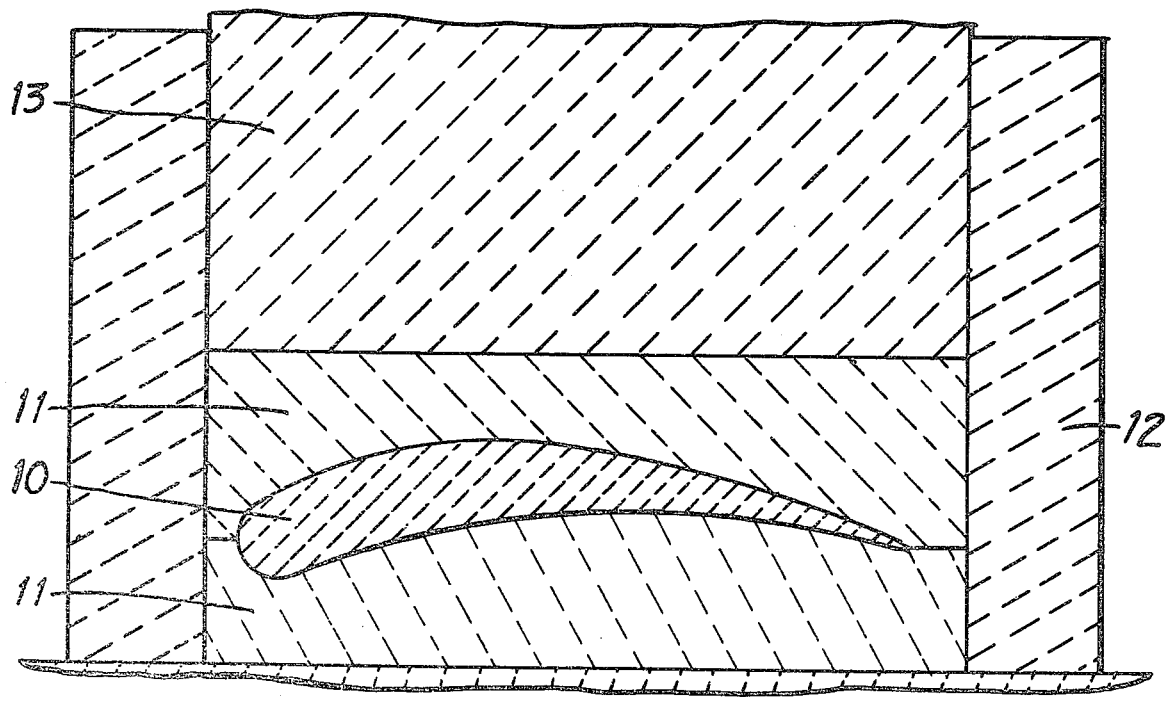

Although the invention is applicable to the fabrication of parts from any powdered materials which are molded by hot-pressing methods, it has particular application to materials which must be formed at high temperature, and are extremely hard, such as refractory oxides, borides, carbides, nitrides, and oxynitrides. Such materials can not be formed by conventional isostatic pressing methods because of the high temperatures involved. Furthermore, because of the hardness of these materials the forming operation must produce an article very close to its final desired dimensions because of the high cost and difficulty of the known machining methods for such materials, such as the use of diamond tools or, where possible, electrical discharge machining.

The matrix material for the shaped mold parts may be any powdered material having the proper compaction and thermal expansion properties, not reactive with the part being molded so as to make separation difficult, and thermally stable without significant phase change under the hot-pressing conditions.

Although the drawing shows the use of pre-shaped mold parts on both sides of the article, in some cases it is possible to employ the shaped preform on one side only of the part. For example, when the part has a non-uniform thickness in the plane perpendicular to the press axis, but has one flat face, a flat graphite mold part having a compaction ratio of unity (final thickness divided by initial thickness) can be employed against the flat face of the part.

While the shape in the following example is convex, and regular, more intricate shapes can be produced by this invention, having reentrant cavities, partially enclosed recesses, and complex unsymetrical forms such as in the drawing forms. Such complex forms are in fact particularly suitable to fabrication by the method of this invention.

An example of the practice of my invention is the production of boron carbide spheres by hot-pressing. The preform is made of boron carbide powder, 9 microns, and is cold pressed to shape in the form of a prolate ellipsoid of revolution having a major axis equal to the desired ball diameter divided by the compaction ratio of the preform. In this example the compaction ratio can be adjusted by the degree of cold pressing and the particular temporary binder, if any, which may be used to give green strength to the preform. A practical ratio in this case is 0.5. The minor axis of the ellipsoid is equal to the sphere diameter. The preform can conveniently be made in two equal halves bisecting the major axis. The mating mold parts are formed of a 50/50 mix of 9 micron boron carbide powder and powdered carbon, with temporary binder of wax. The preform parts are then assembled, placed in a graphite mold with the major axis parallel to the axis of the press and pressed at 1000 to 2000 p.s.i. at a temperature of 2200° C. for approximately five minutes. The resulting spheres, after cooling and separation from the mold parts are accurate spheres of essentially theoretical density.

Other materials can be employed as indicated in the following table. The powders in all cases must be very fine and adjustments in particle size, temporary binder, and proportions in the mix can be made to precisely match the compaction ratio of the mold part matrix material to the compaction ratio of the part preform.

Instead of cold pressing the mold parts and the part preform can be formed by any appropriate ceramic forming technique such as slip casting, sludge coating, machining, sculpting, etc.

The surrounding matrix can also be conveniently produced in one piece by slip casting the material, or sludge casting it, about the part preform, completely enclosing such preform.

| Part Preform | Typical Hot Pressing Conditions | Mold Part Mix | Typical Composition of Mold Part Mix |
|---|---|---|---|
| $Al_2O_3$ | 1700° C. 3000 psi or | MyO:Graphite $Al_2O_3$:Graphite | 60:40 60:40 |
| $TiB_2$ | 2000° C. 3000 psi or | $ZrB_2$:Graphite $TiB_2$:Graphite | 70:30 70:30 |
| TiC | 2050° C. 3000 psi | $ZrB_2$:Graphite TiC:Graphite | 70:30 70:30 |
| $ZrB_2$ | 2050° C. 3000 psi | $ZrB_2$:Graphite | 75.25 |
| $ZrO_2$ (stabilized with 3% CaO) | 1750° C. 3000 psi | $ZrO_2$:Graphite (unstabilized) | 65.25 |
| alpha $Si_3N_4$ + 1% MgO | 1750° C. 3000 psi | alpha or beta $Si_3N_4$:BN alpha or beta $Si_3N_4$:thermatomic carbon or graphite | 50:50 60:40 |
| $Si_2ON_2$ + 5% MgO | 1800° C. 3000 psi | $Si_3N_4$:Carbon $SiON_2$:Carbon | 50:50 60:40 |

What is claimed is:
1. A method of hot-pressing a refractory powder to a desired final shape of non-uniform thickness in cross-section by
   (1) making a first article preform of the powder temporarily bonded to a first shape having a surface contour which when oriented in a mold and uniaxially compressed to final density will deform in a predetermined manner to assume a final predetermined shape having a surface contour different from the shape of said first article preform;
   (2) hot-pressing said preform in a mold including a preformed matrix mold part having a surface exactly mating with a surface of the article preform, a compaction ration the same as that of the article preform, a coefficient of thermal expansion substantially equal to or greater than that of the article preform, and non-reactive with the article preform under hot-pressing conditions, such that upon completion of molding the article can be effectively separated from the matrix mold element, and the part has achieved its predetermined shape.
2. A method as in claim 1 in which the article preform is made from temporarily bonded ceramic material selected from the group of powders consisting of metal oxides, carbides, borides, nitrides, and oxynitrides, and in which the matrix mold element is formed of a carbon powder mixed with a ceramic material selected from the group of powders consisting of metal oxides, carbides, borides, nitrides, and oxynitrides.

* * * * *